Patented Apr. 12, 1932

1,853,414

UNITED STATES PATENT OFFICE

FRITZ GÜNTHER, CURT SCHUSTER, AND JOSEF HETZER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

WETTING AND CLEANING AGENTS

No Drawing. Application filed May 17, 1926, Serial No. 109,306, and in Germany May 22, 1925.

It is known that sulfonic acids of alkylated hydrocarbons possess a high wetting power. It has also been suggested to employ synthetic tans containing sulfonic acid groups as cleaning agents.

We have now found that aromatic sulfonic acid substances, i. e., acids and salts which are not suitable for use as tanning materials, and are therefore incapable of precipitating glue and gelatine from their aqueous solutions, and which are substituted in the nucleus by at least one halogen atom or nitro, hydroxyl or amino group, all of which may be designated as "active substituents", or by several such substituents and also containing, whether in the nucleus or in the substituent, or in both, one or several alkyl groups, possess a high wetting power and are valuable substitutes for soaps and the like. Further they are excellently suitable for emulsifying organic liquids in water and for dispersing dyestuffs or other solid materials. The said sulfonic acids may be employed in the state of free acids or as salts. They offer the great advantage of being stable also in acid solution and in the presence of calcium or other salts forming insoluble precipitates with ordinary soaps.

As examples of suitable sulfonic acids of the aforesaid type, we mentioned di-ethyl-metanilic acid, di-butyl-aniline sulfonic acids, N-di-amyl-alpha-naphthylamine sulfonic acid, iso-propyl-chlor-naphthalene sulfonic acid, iso-propyl-naphthol sulfonic acids and the like or salts of such acids.

The following examples will further illustrate how our invention may be carried out in practice, but the invention is not limited to these examples. The parts are by weight.

Example 1

10 parts of the sodium salt of the product obtained by sulfonating alpha-chlor-naphthalene and condensing it with iso-propyl alcohol are dissolved in 1000 parts of water. Wool is immediately wetted by this solution. The solution is also very capable of forming lather.

Similar results are obtained with aqueous solutions of products obtainable by sulfonating beta-naphthol and subsequently condensing it with aliphatic alcohols.

Example 2

100 parts of a 10 per cent aqueous paste of indanthrene blue RS (see Schultz Farbstofftabellen, 6th ed. (1923) No. 838) are intimately mixed with an aqueous solution of 1 part of di-ethyl-metanilic acid sodium salt and dried. A readily wettable powder which is finely dispersed when mixed with water, is obtained. Other dyestuffs can be treated in a similar manner, whether with the said sulfonic acid or for example with the di-amyl-alpha-naphthylamine sulfonic acid sodium salt.

Example 3

200 parts of di-butyl-aniline sulfonic acid sodium salt are dissolved in 1000 parts of water. The solution is mixed with 400 parts of methyl cyclo-hexanone. A clear solution is obtained which can be strongly diluted with water without becoming dull by a separation of metyl cyclo-hexanone and which is very suitable for use as a cleaning or washing agent.

When employing less di-butyl-aniline sodium sulfonate, methyl cyclo-hexanone or another difficultly soluble organic liquid is emulsified in an excellent manner, but no clear solution is obtained.

We do not lay claim, in this application, to the benzyl-aniline or ethyl-benzyl-aniline sulfonic acids since they are not efficient for the purpose of the present invention.

We claim:

1. A composition of matter of high wetting and cleaning power comprising an aromatic sulfonic acid substance which is not suitable for use as tanning material and which contains at least one alkyl group and at least one active substituent with the exception of benzyl-aniline and ethylbenzyl-aniline sulfonic acids, and methyl cyclohexanone.

2. A composition of matter of high wetting and cleaning power comprising a sulfonic acid substance derived from polynuclear aromatic hydrocarbon, which is not suitable for use as tanning material and which contains at least one alkyl group and at least one active substituent with the exception of benzyl-aniline and ethylbenzyl-aniline sulfonic acids, and methyl cyclohexanone.

3. A composition of matter of high wetting and cleaning power comprising an aromatic sulfonic acid substance which is not suitable for use as tanning material and which contains at least one alkyl group and at least one active substituent with the exception of benzyl-aniline and ethylbenzyl-aniline sulfonic acids, and an organic liquid.

4. A composition of matter of high wetting and cleaning power comprising a sulfonic acid substance derived from a polynuclear aromatic hydrocarbon which is not suitable for use as tanning material and which contains at least one alkyl group and at least one active substituent, with the exception of benzylaniline and ethylbenzyl-aniline sulfonic acids, and an organic liquid.

5. A composition of matter of high wetting and cleaning power comprising a sulfonic acid substance derived from naphthalene, which substance is not suitable for use as tanning material and which contains at least one alkyl group and at least one active substituent, with the exception of benzyl-aniline and ethylbenzyl-aniline sulfonic acids.

6. A composition of matter of high wetting and cleaning power comprising an aromatic sulphonic acid substance which is incapable of precipitating glue and gelatine from their aqueous solutions and which contains at least one alkyl group and at least one substituent selected from the group consisting of halogen, hydroxyl and amino groups and has a wetting power above that of benzyl-aniline and ethyl benzyl-aniline sulphonic acids.

7. A composition of matter of high wetting and cleaning power comprising an aromatic sulphonic acid substance which is incapable of precipitating glue and gelatine from their aqueous solutions and which contains at least one alkyl group and at least one hydroxyl group and has a wetting power above that of benzyl-aniline and ethyl benzyl-aniline sulphonic acids.

8. A composition of matter of high wetting and cleaning power comprising an aromatic sulphonic acid substance which is incapable of precipitating glue and gelatine from their aqueous solutions and which contains at least one alkyl group and at least one amino group and has a wetting power above that of benzyl aniline and ethyl benzyl-aniline sulphonic acids.

9. A composition of matter of high wetting and cleaning power comprising an aromatic sulphonic acid substance which is incapable of precipitating glue and gelatine from their aqueous solutions and which contains at least one alkyl group and at least one halogen atom and has a wetting power above that of benzyl-aniline and ethyl benzyl-aniline sulphonic acids.

10. A composition of matter of high wetting and cleaning power comprising di-butyl aniline sodium sulfonate, water and methyl cyclohexanone.

11. A composition of matter of high wetting and cleaning power comprising an aromatic sulfonic acid substance which is incapable of precipitating glue and gelatine from their aqueous solutions and which contains at least one alkyl group and at least one active substituent and has a wetting power above that of benzyl-aniline and ethylbenzyl-aniline sulfonic acids.

12. A composition of matter of high wetting and cleaning power comprising a sulfonic acid substance derived from a polynuclear aromatic hydrocarbon which is incapable of precipitating glue and gelatine from their aqueous solutions and which contains at least one alkyl group and at least one active substituent and has a wetting power above that of benzyl-aniline and ethylbenzyl-aniline sulfonic acids.

13. The process of preparing aqueous liquids of high wetting and cleaning power characterized by an addition of an aromatic sulfonic acid substance which is incapable of precipitating glue and gelatine from their aqueous solutions and which contains at least one alkyl group and at least one active substituent and has a wetting power above that of benzyl-aniline and ethylbenzyl-aniline sulfonic acids.

14. The process of preparing aqueous liquids of high wetting and cleaning power characterized by an addition of a sulfonic acid substance derived from a polynuclear aromatic hydrocarbon which is incapable of precipitating glue and gelatine from their aqueous solutions and which contains at least one alkyl group and at least one active substituent and has a wetting power above that of benzyl-aniline and ethylbenzyl-aniline sulfonic acids.

15. The process of wetting materials which comprises treating the materials with an aqueous liquid characterized by an addition of an aromatic sulfonic acid substance which is incapable of precipitating glue and gelatine from their aqueous solutions and which contains at least one alkyl group and at least one active substituent and has a wetting power above that of benzyl-aniline and ethylbenzyl-aniline sulfonic acids.

16. The process of wetting materials which comprises treating the materials with an aqueous liquid characterized by an addition of a sulfonic acid substance derived from a polynuclear aromatic hydrocarbon which is incapable of precipitating glue and gelatine from their aqueous solutions and which contains at least one alkyl group and at least one active substituent and has a wetting power above that of benzyl-aniline and ethyl-benzyl-aniline sulfonic acids.

In testimony whereof we have hereunto set our hands.

FRITZ GÜNTHER.
CURT SCHUSTER.
JOSEF HETZER.